(12) United States Patent
Hivert

(10) Patent No.: US 10,530,407 B2
(45) Date of Patent: Jan. 7, 2020

(54) ADAPTIVE FILTERING METHOD FOR AN AMPLITUDE-MODULATED RADIO SIGNAL

(71) Applicants: Continental Automotive France, Toulouse (FR); Continental Automotive GmbH, Hannover (DE)

(72) Inventor: Grégoire Hivert, Coulombs (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 0 days.

(21) Appl. No.: 16/330,401

(22) PCT Filed: Sep. 7, 2017

(86) PCT No.: PCT/FR2017/052377
§ 371 (c)(1),
(2) Date: Mar. 5, 2019

(87) PCT Pub. No.: WO2018/046856
PCT Pub. Date: Mar. 15, 2018

(65) Prior Publication Data
US 2019/0349015 A1    Nov. 14, 2019

(30) Foreign Application Priority Data

Sep. 12, 2016  (FR) ..................... 16 58462

(51) Int. Cl.
*H04B 1/10*    (2006.01)
*H04L 27/06*   (2006.01)
(52) U.S. Cl.
CPC ........... *H04B 1/1036* (2013.01); *H04L 27/06* (2013.01); *H04B 2001/1054* (2013.01)

(58) Field of Classification Search
CPC ............ H04L 27/06; H04B 2001/1054; H04B 1/1036
See application file for complete search history.

(56) References Cited

U.S. PATENT DOCUMENTS

| 4,206,317 A | 6/1980 | Kahn |
| 6,178,314 B1 | 1/2001 | Whikehart et al. |
| (Continued) | | |

FOREIGN PATENT DOCUMENTS

EP    1315303 A1    5/2003

OTHER PUBLICATIONS

English translation of the Written Opinion for International Application No. PCT/FR2017/052377, dated Nov. 21, 2017—6 pages.

(Continued)

*Primary Examiner* — Siu M Lee
(74) *Attorney, Agent, or Firm* — RatnerPrestia

(57) ABSTRACT

The present invention relates to an adaptive filtering method for an amplitude-modulated radio signal (AM), the radio signal having a bandwidth, the method comprising: • transforming the radio signal into baseband, • measuring the level of noise and/or detecting the presence of an adjacent radio signal (A), of a first side of the bandwidth, • selecting or not selecting a first filter (F) numbered X, from among N first filters capable of cutting the amplitude-modulated radio signal of the first side of the bandwidth, • if a first filter numbered X is selected and applied to the amplitude-modulated radio signal transformed into baseband, the automatic selection of a second filter (F') numbered Y, Y being greater than or equal to X, from among N second filters, capable of cutting the amplitude-modulated radio signal from the opposite side to the first side of the bandwidth.

7 Claims, 2 Drawing Sheets

(56) References Cited

U.S. PATENT DOCUMENTS

| | | | |
|---|---|---|---|
| 6,211,663 B1 | 4/2001 | Moulthrop et al. | |
| 8,428,526 B2* | 4/2013 | Wang | H03J 3/08 |
| | | | 455/126 |
| 10,256,856 B2* | 4/2019 | Das | H03M 1/0629 |
| 2015/0071392 A1* | 3/2015 | Cheah | H04B 1/123 |
| | | | 375/350 |
| 2019/0207634 A1* | 7/2019 | Hivert | G10L 25/81 |

OTHER PUBLICATIONS

International Search Report and Written Opinion for International Application No. PCT/FR2017/052377, dated Nov. 21, 2017—8 pages.

International Search Report and Written Opinion for International Application No. PCT/FR2017/052380, dated Nov. 21, 2017—9 pages.

Notice of Allowance for U.S. Appl. No. 16/330,473, dated Sep. 26, 2019, 12 pages.

\* cited by examiner

ADAPTIVE FILTERING METHOD FOR AN AMPLITUDE-MODULATED RADIO SIGNAL

CROSS REFERENCE TO RELATED APPLICATIONS

This application is the U.S. National Phase Application of PCT International Application No. PCT/FR2017/052377, filed Sep. 7, 2017, which claims priority to French Patent Application No. 1658462, filed Sep. 12, 2016, the contents of such applications being incorporated by reference herein.

FIELD OF THE INVENTION

The invention relates to the field of the limiting of noise in a radio signal, more precisely in an amplitude-modulated radio signal, in particular intended for implementation in radio receivers on board automotive vehicles.

Within this framework, an aspect of the present invention envisages a method of adaptive filtering of the noise in an amplitude-modulated radio signal, through the implementation of a dynamic selectivity technique.

BACKGROUND OF THE INVENTION

As is known, a radio receiver, especially in a multimedia system of an automotive vehicle, is able to receive a radio signal, in particular an AM radio signal, AM being the abbreviation of "Amplitude Modulation".

Such an AM radio signal, received in modulated form by a radio receiver, is subjected to various sensors and to a suitable filtering adapted so that the corresponding demodulated radio signal can be rendered under good conditions, especially in the cabin of an automotive vehicle.

The person skilled in the art knows the operating principle of an AM, that is to say amplitude-modulated, radio signal received by a suitably adapted radio receiver, with a view to being demodulated and then rendered to listeners.

Thus, an AM radio signal comprises a carrier p(t) of the signal, of frequency $f_p$, satisfying the equation:

$$p(t) = A \cdot \sin(2 \cdot \pi \cdot f_p)$$

and a message m(t) to be transmitted satisfying the equation:

$$m(t) = M \cdot \cos(2 \cdot \pi \cdot f_m \cdot t + \varphi)$$

The corresponding modulated signal y(t) then satisfies the equation:

$$y(t) = [1 + m(t)] * p(t),$$

i.e.:

$$y(t) = A \cdot \sin(2 \cdot \pi \cdot f_p \cdot t) + \frac{A \cdot M}{2} \cdot [\sin(2 \cdot \pi \cdot (f_p + f_m) + \varphi) + \sin(2 \cdot \pi \cdot (f_p - f_m) + \varphi)]$$

From a spectral point of view, starting from a message m(t) composed of several frequencies, the amplitude of the Fourier transform FFT of the modulated signal y(t) containing the message m(t), as a function of frequency F, is represented in FIG. 1.

To demodulate the AM radio signal, the latter is converted to baseband, in such a way that the message m(t) is centered around 0 Hz, as represented in FIG. 2.

A known problem resides in the fact that the AM radio signal received may be noisy or disrupted by an adjacent radio signal, making its rendition unsatisfactory. Therefore, it is known to filter the demodulated radio signal, before its rendition, with a view to eliminating therefrom or to limiting the noise and the disruptive interference due to the adjacent signals.

However, the filtering performed in the demodulated signal is applied by definition to the message, that is to say to the relevant data of the received radio signal, such as the audio signal to be rendered. The filtering performed at this level of the audio chain of the multimedia system, that is to say after demodulation of the radio signal received, therefore presents the drawback of inducing an adulteration of the data contained in said radio signal.

SUMMARY OF THE INVENTION

According to an aspect of the present invention, provision is consequently made to carry out an optimized filtering of the AM radio signal received before demodulating it, so as to eliminate or limit the noise that it comprises, in real time, according to a dynamic selectivity technique.

An aspect of the present invention is thus aimed at optimizing the implementation of a dynamic selectivity technique by carrying out an adaptive filtering, able to apply a suitably adapted filtering on each side of the passband, as a function of data arising from a sensor of presence of an adjacent radio signal and/or arising from a noise level sensor.

The prior art does not describe any method making it possible to obtain an adaptive filtering such as this on an amplitude-modulated radio signal with a view to reducing the noise that it comprises. Indeed, in practice, in the known radio receivers, dynamic selectivity is even generally deactivated provided that no adjacent radio signal has been detected.

According to an aspect of the invention, several filters are applied to the AM radio signal, to cut off certain parts of the received signal, above and below cutoff frequencies, on the basis of the signal converted to baseband, both to deal with the question of the possible presence of an adjacent radio signal and that of the presence of noise in the AM radio signal received.

For the purposes of selecting the adapted filter or filters, sensors of noise, of modulation, of adjacent and of level, can be implemented on the amplitude-modulated signal received so as to determine the filters to be applied. After filtering, the signal is demodulated and the audio message recovered and rendered.

In particular, an aspect of the present invention envisages a method of adaptive filtering of an AM radio signal.

Starting from the observation made empirically, and well known to the person skilled in the art, that when significant noise is detected on one side of the passband of an AM radio signal considered, for example on the positive side on the signal converted to baseband, then in general noise exists in the AM radio signal on the other side of the passband, that is to say on the negative side on the signal converted to baseband, the method according to an aspect of the invention proposes to automatically select a filter so as to cut off the signal on the negative side of the passband when noise has been detected on the positive side of the passband, as a function of the filter implemented on said positive side of the passband, and vice versa.

To this end, more precisely, the subject of an aspect of the present invention is a method of adaptive filtering of an amplitude-modulated radio signal, said radio signal exhibiting a passband, said method comprising:

the transformation of said radio signal into baseband, in such a way that the representation of the Fourier transform of said radio signal as a function of frequency exhibits a passband centered on 0 Hz, the implementation of a method for measuring the noise level and/or the implementation of a method for detecting presence of an adjacent radio signal; on a first side of the passband, on the amplitude-modulated radio signal transformed to baseband, as a function of the measured noise level and/or of the presence of an adjacent radio signal, the selection or otherwise of a first filter numbered X, from among N first filters able to cut off the amplitude-modulated radio signal on the first side of the passband, N being an integer number greater than 1, ranging from the first narrowest filter, numbered 1, to the first widest filter, numbered N, X being an integer number lying between 1 and N, said first filter numbered X being intended to be applied to the amplitude-modulated radio signal transformed to baseband, if a first filter numbered X is selected and applied to the amplitude-modulated radio signal transformed to baseband, then there is automatic selection of a second filter numbered Y, Y being greater than or equal to X, from among N second filters, able to cut off the amplitude-modulated radio signal on the side opposite to the first side of the passband, said N second filters being respectively symmetric with the N first filters, ranging from the second narrowest filter, numbered 1, to the second widest filter, numbered N, said second filter numbered Y being applied to the amplitude-modulated radio signal transformed to baseband.

The method according to an aspect of the invention thus allows an improvement of the filtering of an amplitude-modulated radio signal, before its demodulation.

According to one embodiment, the index number Y of the second filter is determined as follows:

Y is equal to N/2 if N/2 is an integer number and if N/2>X;

Y is equal to (N/2+0.5) if N/2 is not an integer number and if (N/2+0.5)>X;

Y is equal to N in the other cases.

Advantageously, when the index number of the first filter selected as a function of the noise level measured on a side of the passband is modified, the method according to an aspect of the invention makes provision for the waiting of a predetermined time before applying said first modified filter to the amplitude-modulated radio signal if and only if said modified index number of the first filter is confirmed at the conclusion of said predetermined time.

According to one embodiment, said N first filters and said N second filters exhibit real-time configurable cutoff frequencies.

According to one embodiment, said N first filters and said N second filters are finite impulse response filters.

An aspect of the present invention also envisages a radio receiver comprising a microcontroller configured to implement the method of adaptive filtering of an amplitude-modulated radio signal such as briefly described hereinabove.

An aspect of the present invention also envisages an automotive vehicle comprising a radio receiver such as briefly described hereinabove.

BRIEF DESCRIPTION OF THE DRAWINGS

Aspects of the invention will be better understood on reading the description which follows, given solely by way of example, and referring to the appended drawings which represent.

It should be noted that the figures set forth aspects of the invention in a detailed manner so as to enable the implementation thereof, said figures also being able to serve to better define aspects of the invention, of course.

DETAILED DESCRIPTION OF THE PREFERRED EMBODIMENTS

The method of adaptive filtering of an AM radio signal according to an aspect of the invention are presented with a view to an implementation, principally, in a radio receiver of a multimedia system on board an automotive vehicle.

However, the implementation of an aspect of the present invention in any other technical field, in particular in any type of AM radio receiver, is also envisaged.

In the subsequent description, an aspect of the present invention is presented in conjunction with the reception of an AM radio signal, received by a radio receiver, for example on board a vehicle, in the context of a set of frequency bands devoted to these signals and organized in accordance with the local standards.

As is known, the width of the spectrum of an amplitude-modulated radio signal is standardized, at 9 kHz for Europe and at 10 kHz in North America, for example.

In Europe, the passband of the corresponding audio signal is in practice normally 4.5 kHz. However, certain transmitters have widened passbands with passbands of possibly up to 9 kHz.

Consequently, within the framework of an aspect of the present invention, for the implementation of a method for determining the noise level in the modulated AM radio signal, converted to baseband, by way of adapted sensors, it is useful to concern oneself with the radio signal considered at the limits of its audio passband. Typically, in Europe, the noise will be analyzed around 5 kHz and up to 9 kHz, for the purposes of filtering the AM radio signal in an optimal manner before its demodulation.

It should be noted that a fine adjustment of the bracket of frequencies over which the noise in the AM radio signal can be measured is preferably carried out. This fine adjustment makes it possible in particular to guard against the possible presence of widened-band radio signals, requiring a widening of the bracket of frequencies forming the subject of noise measurements.

Furthermore, this fine adjustment makes it possible to take account of the absence or of the presence of an adjacent radio signal. Typically, in Europe, the number of transmitters being limited, the presence of an adjacent is less probable that in North America where the number of radio transmitters is more significant.

It should be noted that, in this context, when no adjacent radio signal is detected, at least on one side of the spectrum, it is a priori less necessary to filter the signal in order to ensure the preservation of a maximum of useful data. However, this presents the risk of giving rise to a noisier signal.

Figure 1:
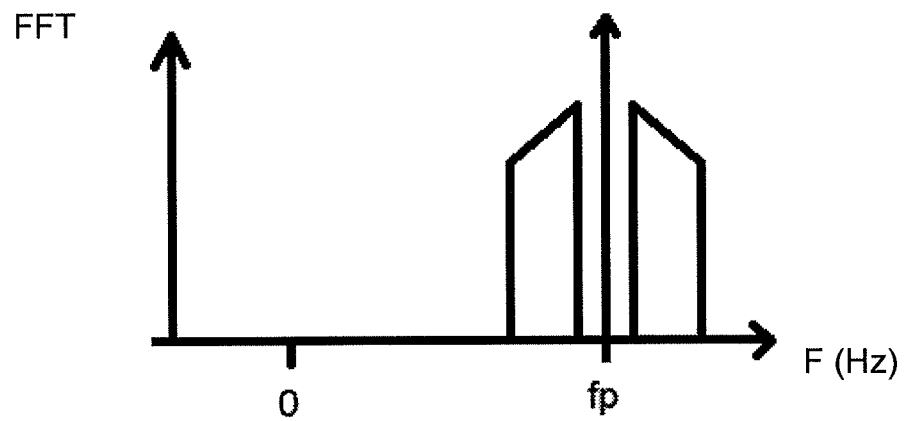
FIG. 1, the simplified chart of an FFT Fourier transform of an amplitude-modulated signal as a function of frequency.
Figure 2:
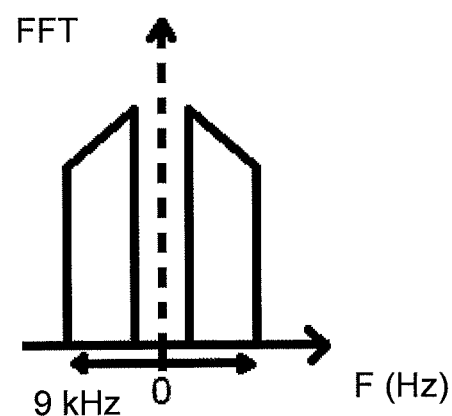
FIG. 2, the simplified chart of such a Fourier transform of an amplitude-modulated signal, converted to baseband.
Figure 3:
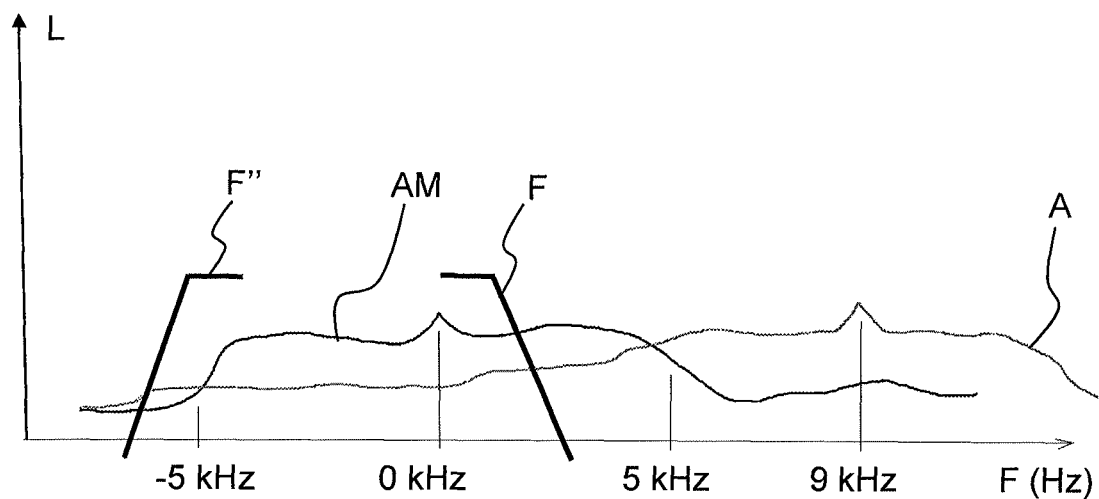
FIG. 3, the graph of the level L of an amplitude-modulated radio signal as a function of frequency, converted to baseband, in the presence of an adjacent radio signal, without implementation of the adaptive filtering method according to an aspect of the invention.
Figure 4:
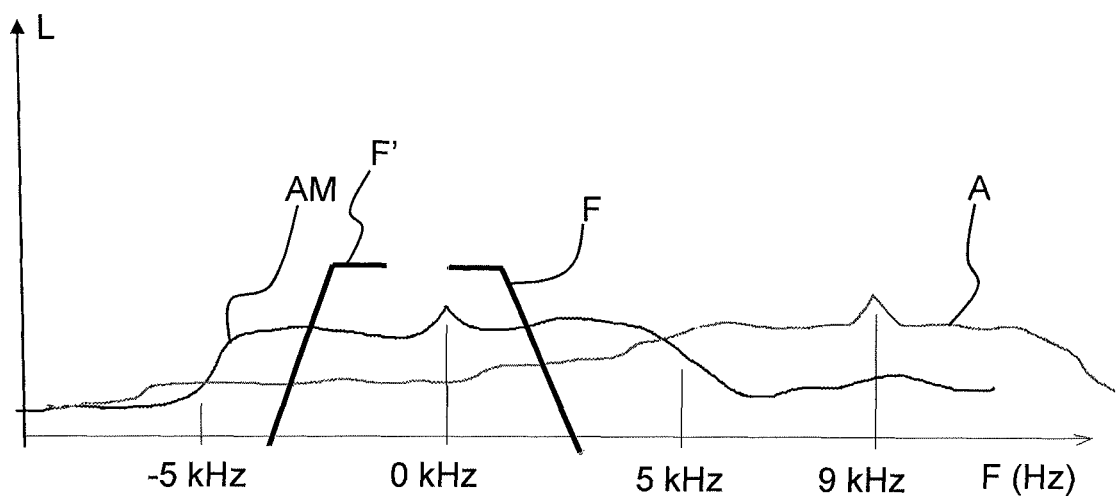
FIG. 4, the same graph as in FIG. 3, with the implementation of the adaptive filtering method according to an aspect of the invention.

With reference to FIGS. 3 and 4, there is represented the level L of an amplitude-modulated AM radio signal, exhibiting a passband of about 9 kHz. The AM radio signal has been converted to baseband, by a suitably adapted transformation, so that it is centered on 0 Hz.

In the example of FIGS. 3 et 4, the AM radio signal is followed by an adjacent radio signal A.

On account of the presence of an adjacent radio signal A, in this instance, on the right of the passband, a first filter F is selected to cut off the AM radio signal on the side of the passband where an adjacent signal A has been detected.

It should be noted that the passband side considered may also be the side of the passband where a significant noise level has been measured, whether or not there is, moreover, an adjacent radio signal on this same side.

In FIG. 3, representative of the prior art, the presence of an adjacent radio signal A (or the presence of a significant noise level) on the first side of the passband does not automatically impact the selection of a second filter for the other side of the passband, so that this other side of the AM radio signal may be noisy.

If, independently of the application of the filter F on the first side of the passband, a filter F″ is selected to cut off the AM radio signal on the other side of the passband, it may be insufficient to correctly limit the noise in the AM radio signal.

Conversely, with reference to FIG. 4, in the case where, because of the noise level and/or because of the presence of an adjacent radio signal A, on a first side of the passband, a first filter F is selected to cut off the AM radio signal, on said first side, an aspect of the present invention makes provision for the automatic selection of a second filter F′, symmetric or non-symmetric, intended to cut off the AM radio signal on the side opposite to the first side of the passband.

This principle ensues from the fact that, in an empirical manner, it is observed generally that when noise is present of one side of the passband, adulterating the amplitude-modulated radio signal, noise is also present on the other side of the passband.

Thus, according to an aspect of the invention, even if the noise level is not measured on the other side of the passband, even if, in the case where the noise level is measured on this other side of the passband, it does not automatically involve the selection of a filter on this other side, even if no adjacent radio signal is detected on this other side, provision is made for the automatic selection of a second filter F′ on this other side of the passband.

The second filter F′ selected for this other side of the passband of the AM radio signal is dependent on the first filter F selected for the first side of the passband.

In practice, as a function of the noise level measured on the first side of the passband and/or as a function of the presence of an adjacent radio signal, a first filter F is selected, from among N first filters able to cut off the amplitude-modulated radio signal on the first side of the passband, N being an integer number greater than 1, ranging from the first narrowest filter, numbered 1, to the first widest filter, numbered N. The first selected filter is numbered X. To take a nonlimiting example, there exist for example three first filters, the filter numbered 1 being the narrowest and the filter numbered 3 being the widest, and the filter selected is the filter numbered 2.

According to an aspect of the invention, from among N second filters, able to cut off the amplitude-modulated radio signal on the side opposite to the first side of the passband, said N second filters being respectively symmetric with the N first filters, a filter numbered Y is automatically selected to cut off the AM radio signal on the side opposite to the first side of the passband. The index number Y of the second filter F′ selected is greater than or equal to the index number X of the first filter F selected.

In the illustrative example mentioned previously, the second selected filter is for example numbered 3.

The index number Y of the second filter F′ selected automatically can be determined by calculation according to a chosen formula, as a function of the index number X of the first selected filter F. For example, the index number Y of the second filter F′ is determined as follows: Y is equal to N/2 if N/2 is an integer number, on condition that N/is greater than X, and Y is equal to (N/2+0.5) if N/2 is not an integer number, still on condition that N/2 is greater than X.

In the other cases, the index number Y of the second filter F′ is equal to N.

Thus, the filters F, F′ implemented may be symmetric, in the sense that they cut off in a symmetric manner, respectively above and below their cutoff frequency.

The filters F, F′ implemented may, conversely, be asymmetric.

According to one embodiment, the filters F, F′ selected are finite impulse response filters, often designated, by the person skilled in the art, by the abbreviation FIR for "Finite Impulse. Filter" in English.

According to an aspect of the invention, the real-time selection of the filters to be implemented, as a function of the normed noise level in the signal and/or as a function of the presence of adjacent radio signals, makes it possible to carry out optimal dynamic selectivity in the AM radio signal received, before its demodulation.

According to one embodiment, provision is made furthermore for a hysteresis mechanism, according to which, in the case where a change of filter index number is determined because of the data arising from sensors of noise level or presence of adjacent, a predetermined time, corresponding to a dead time, is complied with before applying the new filter to the AM radio signal, so as to verify that the new filter index number determined by the method is confirmed.

This embodiment exhibits the advantage of alleviating the phenomenon of beating which arises when a filter applied to the AM radio signal changes at closely spaced time intervals.

It is specified, furthermore, that aspects of the present invention are not limited to the embodiment described hereinabove and is susceptible to variants accessible to the person skilled in the art.

The invention claimed is:

1. A method of adaptive filtering of an amplitude-modulated radio signal, said amplitude-modulated radio signal exhibiting a passband, said method comprising:
   transforming said amplitude-modulated radio signal into baseband, in such a way that a representation of a Fourier transform of said radio signal as a function of frequency exhibits a passband centered on 0 Hz,
   measuring a noise level and/or detecting presence of an adjacent radio signal, on a first side of the passband, on the amplitude-modulated radio signal transformed to baseband, selecting a first filter numbered X, from among N first filters able to cut off the amplitude-modulated radio signal on the first side of the passband, as a function of the measured noise level and/or the presence of the adjacent radio signal, N being an integer number greater than 1, ranging from the first narrowest filter, numbered 1, to the first widest filter, numbered N, X being an integer number lying between 1 and N, said first filter numbered X being intended to be applied to the amplitude-modulated radio signal transformed to baseband, automatic selection of a second filter numbered Y, Y being greater than or equal to X, from among N second filters, able to cut off the amplitude-modulated radio signal on the side opposite to the first side of the passband, said N second filters being respectively symmetric with the N first filters, wherein Y ranging from the second narrowest filter, numbered 1, to the second widest filter, numbered N, said second filter numbered Y being applied to the amplitude-modulated radio signal (AM) transformed to baseband, wherein the index number Y of the second filter is determined as follows:

Y is equal to N/2 if N/2 is an integer number and if N/2>X;

Y is equal to (N/2+0.5) if N/2 is not an integer number and if (N/2+0.5)>X;

Y is equal to N in the other cases.

2. The method of adaptive filtering of an amplitude-modulated radio signal, as claimed in claim 1, comprising moreover, when the index number of the first filter selected as a function of the noise level measured on a side of the passband is modified, the waiting of a predetermined time before applying said first modified filter to the amplitude-modulated radio signal if and only if said modified index number of the first filter is confirmed at the conclusion of said predetermined time.

3. The method of adaptive filtering of an amplitude-modulated radio signal, as claimed in claim 1, in which said N first filters and said N second filters exhibit real-time configurable cutoff frequencies.

4. The method of adaptive filtering of an amplitude-modulated radio signal, as claimed in claim 1, in which said N first filters and said N second filters are finite impulse response filters.

5. A radio receiver comprising a microcontroller configured to implement the method of adaptive filtering of an amplitude-modulated radio signal as claimed in claim 1.

6. An automotive vehicle comprising a radio receiver as claimed in claim 5.

7. The method of adaptive filtering of an amplitude-modulated radio signal, as claimed in claim 2, in which said N first filters and said N second filters exhibit real-time configurable cutoff frequencies.

* * * * *